United States Patent Office 3,577,403
Patented May 4, 1971

3,577,403
1,1-BIS-[4-(1'-BENZYL-3'-METHYL-PYRAZALONE-
AZO)PHENYL]CYCLOHEXANE
Hans Raab and Günter Hagelloch, Cologne-Stammheim,
Germany, assignors to Farbenfabriken Bayer Aktien-
gesellschaft, Leverkusen, Germany
No Drawing. Filed Dec. 12, 1967, Ser. No. 689,786
Claims priority, application Germany, Dec. 17, 1966,
F 50,995
Int. Cl. C09b 31/14; C09d 11/16, 11/18
U.S. Cl. 260—160
1 Claim

ABSTRACT OF THE DISCLOSURE

A water-insoluble diazo dyestuff particularly advantageous in the dyeing of inks and pastes for ball point pens is produced by coupling 1-benzyl-3-methyl-pyrazolone with 1,1-bis-(4-aminophenyl)cyclohexane.

The present invention is concerned with the water-insoluble disazo dyestuff of the formula

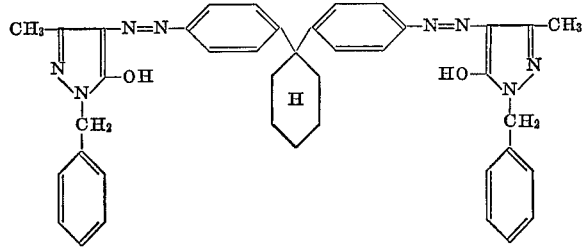

and a process for its production.

The dyestuff of the above mentioned formula is obtained by coupling tetrazotized 1,1-bis-(4'-aminophenyl)-cyclohexane with 1-benzyl-3-methyl-pyrazolone in known manner, preferably in aqueous solution or suspension at temperatures of about 0–10° C. After coupling the dyestuff may be separated from the reaction mixture by filtration.

The starting component 1-benzyl-3-methyl-pyrazolone-5 is a known substance and may be obtained for example by reacting benzylhydrazine with acet acetic acid ethyl ester as described by Curtius in "Journal für praktische Chemie," 2, 85, page 50 or in the German patent specification 1,003,215.

The starting component 1,1-bis-(4'-aminophenyl)cyclohexane is known too and may be prepared by condensation of aniline with cyclohexanone.

The new yellow disazo dyestuff is excellently soluble in organic solvents as for example alcohols such as benzyl alcohol and is suitable for the dyeing of inks and pastes for ball point pens.

The parts given below are parts by weight.

Example

A tetrazo solution prepared in conventional manner from 23.2 parts of 1,1-bis-(4'-aminophenyl)cyclohexane is introduced at 5° C. in a solution of 1-benzyl-3-methyl-pyrazolone-5 prepared in the following manner: 33.3 parts of the pyrazolone compound are dissolved at 80° C. in 300 parts of water containing 28 parts of sodium carbonate and purified with the aid of charcoal. After the addition of sufficient ice to hold a temperature of 5° C. the reaction mixture is stirred for ½ hour. The precipitated dyestuff is filtered off with suction, washed with water (free from calcium carbonate and salts) and dried at 50° C. There are obtained 47.5 parts of a dyestuff which is highly soluble in hydrocarbons, benzyl alcohol, esters, fatty oils and paraffines with a yellow shade and which may be used for dyeing pastes for ball point pens.

We claim:
1. A water-insoluble disazo dyestuff of the formula

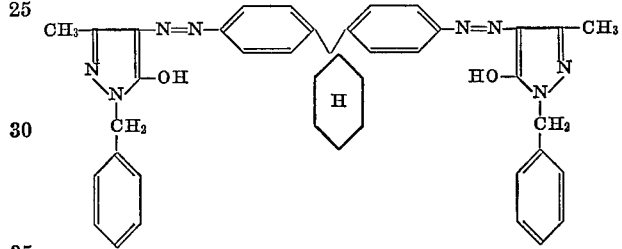

References Cited

UNITED STATES PATENTS

| | | | |
|---|---|---|---|
| 1,233,742 | 7/1917 | Anderwert et al. | 260—160 |
| 1,819,957 | 8/1931 | Krebser et al. | 260—160X |
| 1,838,235 | 12/1931 | Schule et al. | 260—160X |
| 2,241,795 | 5/1941 | Taube et al. | 260—160X |
| 3,124,566 | 3/1964 | Jung et al. | 260—160 |
| 3,313,799 | 4/1967 | Noll | 260—160 |

FLOYD DALE HIGEL, Primary Examiner

U.S. Cl. X.R.

106—22, 288; 260—141, 578